Feb. 28, 1961     J. M. LYLE     2,973,010

HOT WATER SUPPLY SYSTEMS AND COMPONENTS

Filed April 4, 1957

INVENTOR
John M. Lyle

BY
Strauch, Nolan & Neale

ATTORNEYS

United States Patent Office 2,973,010
Patented Feb. 28, 1961

2,973,010

HOT WATER SUPPLY SYSTEMS AND COMPONENTS

John M. Lyle, Kalamazoo, Mich., assignor to Ruud Manufacturing Company, Kalamazoo, Mich., a corporation of Delaware Filed Apr. 4, 1957, Ser. No. 650,741

1 Claim. (Cl. 137—564)

This invention relates to hot water supply systems and more particularly to systems and system components for delivering a supply of hot water to an appliance such as a dishwasher.

In many cases, particularly in commercial establishments, dishwashers and like appliances which require a supply of hot water at temperatures of 180° or more are located at a considerable distance from the hot water storage tank. Often the interval between periods of use of the appliance is sufficient to permit the water in the supply lines to fall well below the minimum temperature necessary for satisfactory operation of the appliance.

Accordingly, it has been proposed to recirculate the water in the supply lines at a rate sufficient to assure a supply of hot water at a point close to the appliance. While such systems have been used with some degree of success, nevertheless their performance has been erratic, the systems have been relatively costly to install and have often required the attendance of an operator to provide the desired operation.

One of the principal difficulties encountered in prior systems has been caused by the failure to provide for adequate control of the water recirculation rate which is of primary importance in such systems. If the recirculation rate is excessively high, the desired stratification of the hot water in the storage tank may be destroyed while if the recirculation rate is too low, the supply of water at the appliance tap cannot be maintained at the desired temperature.

It is, accordingly, the principal purpose and object of the present invention to provide improved systems for recirculating hot water in appliance supply lines which overcome the above-stated disadvantages of the prior systems.

The recirculating systems of the present invention include a return line connected to the appliance supply line at a point adjacent the appliance and leading to the hot water storage tank and including novel means for automatically assuring the desired flow rate in the recirculation line. More specifically, the flow control device provided by the present invention is an orifice of fixed size which is incorporated in a unique manner in the otherwise standard drain fitting provided on the hot water storage tank.

It is, thus, a further object of the invention to provide improved flow control devices for hot hater recirculation systems.

It is also an object of the invention to provide a flow control orifice for a hot water recirculation system which is incorporated in the standard tank drain fitting thereby eliminating the separate connection to the tank required in prior systems thus substantially decreasing the cost of the tank and the cost of installation of the recirculating system.

It is an additional object of the present invention to provide improved recirculation systems which may be readily and inexpensively installed in existing systems without modification of the hot water storage tank.

Additional objects and advantages will become apparent as the description proceeds in connection with the accompanying drawings in which.

Figure 1:
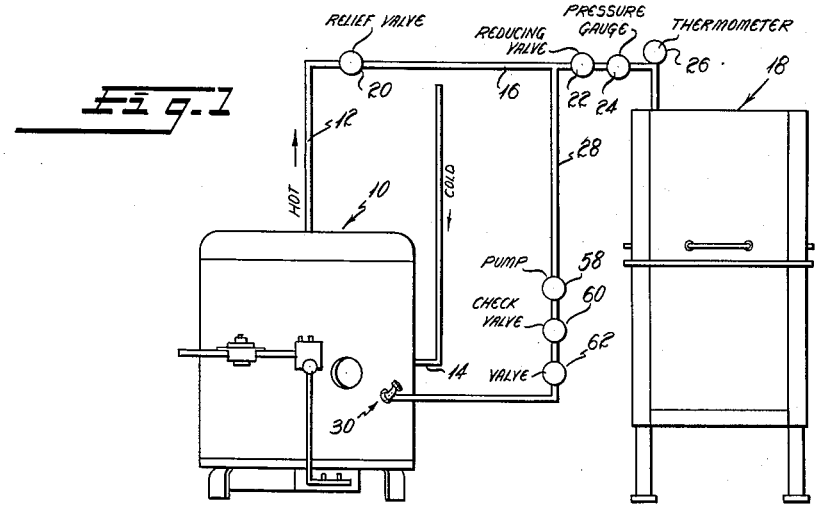
Figure 1 is a semi-diagrammatic view of a hot water supply system including the novel recirculation system of the present invention, the system being shown in a typical application for servicing a dishwasher.

Referring now more particularly to the drawings, indicated generally at 10 in Figure 1 is a conventional hot water storage tank having a delivery line 12 and a cold water inlet line 14, the former being connected to the top of the tank and the latter being connected to the bottom of the tank in accord with conventional practice to assure delivery of the hottest water in the tank to the appliance.

The hot water storage tank 10 is in all respects conventional and need not be described in detail.

Figure 2:
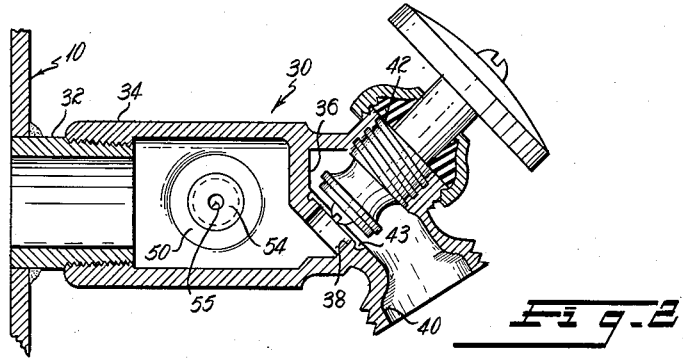
Figure 2 is an enlarged sectional view of the combined flow control and drain unit of the system of Figure 1.
Figure 3:
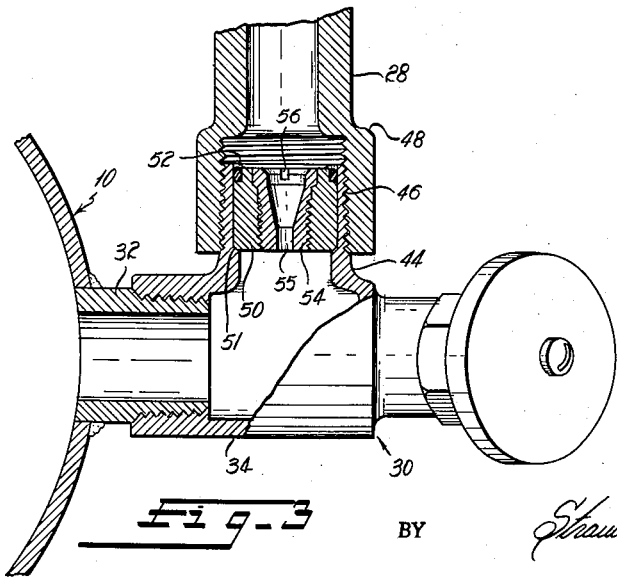
Figure 3 is a top plan view partly in section of the unit of Figure 2.

A branch supply line 16 connects the main supply line 12 and the appliance, such as the dishwasher indicated generally at 18. The main supply line 12 is provided with the usual relief valve 20 and the branch line 16 incorporates a pressure reducing valve 22, a pressure gauge 24 and a thermometer 26 to facilitate determination of the temperature and pressure at which the water is being supplied to the dishwasher. The recirculation line 28 is connected to the branch supply line 16 just upstream of the pressure reducing valve 22. The combined length of the main supply conduit 12 and the branch conduit 16 may be as much as fifty feet. However, the distance between the dishwasher and the connection of the recirculation line 28 to the branch line 16 is relatively short, for example, two or three feet. The opposite end of the recirculation line 28 is connected to the hot water storage tank 10 through a novel combined flow control and drain unit indicated generally at 30 which forms an important part of the present invention and which is shown in detail in Figures 2 and 3.

The unit 30 replaces the standard drain fitting provided with all hot water storage tanks to facilitate the periodic draining and flushing of the tanks, and is threaded onto the standard drain pipe fitting 32 leading into the bottom of the side wall of the tank. The unit 30 includes a hollow cylindrical body portion 34, one end of which is threaded onto the fitting 32 and the opposite end of which is provided with a wall 36 having an opening 38 connecting the interior of the body section 34 to a drain outlet passage 40. The opening 38 is normally closed by a conventional valve assembly indicated generally at 42 and seating 43 which is opened only when it is desired to drain or flush the tank. The body portion 34 of the unit 30 is provided with an integral hollow side boss 44, the axis of which is substantially normal to the axis of the body portion 34. The boss 44 is provided with threads 46 onto which a standard fitting 48 at the end of the recirculation line 28 is threaded.

Press-fitted or otherwise suitably mounted in the interior of the boss 44 is an internally threaded fitting 50. Preferably the fitting 50 is internally seated on boss shoulder 51 and is permanently and sealingly secured within the boss 44 by a soldered joint 52. Alternately the fitting or its equivalent can be formed integrally with the boss 44. Removably threaded into the fitting 50 is an orifice fitting 54 which has an opening 55 of such size as to control the rate of water circulation through the return line 28. Preferably the outer end of the orifice fitting 54 is provided with slots 56 or other tool receiving surfaces to facilitate the removal or replacement of the fitting with conventional tools.

When the system is in operation water will circulate through the system outside the appliance and down through pipe 28 by convection. However, it is usually desirable to provide for positive circulation of the water through the recirculation system. Accordingly, a pump 58 is provided in the recirculation line, the outlet side of which leads through a check valve 60 to a normally open shutoff valve 62. Regardless of the nature of the system, the system requirement or the method of obtaining circulation in the return line 28, it is a simple matter to select and install an orifice fitting 54 of the proper size to maintain the flow through the return line at an optimum value.

Once the proper orifice size is selected, the system requires no further attention and the problems of regulation, maintenance and possible clogging associated with certain prior systems in which a controllable valve was used to regulate the recirculation rate are completely avoided.

In general the size of the orifice 54 is selected to provide the flow necessary to maintain the temperature in the supply lines slightly above the desired minimum value while preventing excessive flow which has several important disadvantages. For example, excessive recirculation flow involves undesirable heat loss in the flow and return lines and may disturb the normal distribution of hot water in the storage tank. It is usually important to maintain the hottest water near the heater outlet and overcirculation of water through the return line will destroy the stratification within the tank and may equalize the temperature in the system.

In prior systems incorporating a manually controllable valve in a recirculation line, there has been a tendency for maintenance personnel to set the valve at a position near full open to avoid the problems incident to the extremely small apertures established in the valve when it is set for optimum operation. The use of the fixed orifice 54 in accordance with the present invention completely eliminates this difficulty and affords a system which is both substantially foolproof and tamperproof.

The novel flow control device of the present invention also avoids undue disturbance or turbulence within the tank since the downstream side of the orifice 54 leads into the side of the enlarged diffuser body portion 34 of the combined unit 30 rather than directly into the tank. Accordingly, a low velocity stream enters the tank which does not disturb the water or stir up sediment within the tank.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which comes within the meaning and range of equivalency of the claim are therefore intended to be embraced therein.

What is claimed and desired to be secured by the United States Letters Patent is:

A hot water supply system comprising a hot water storage tank having a drain pipe fitting at its lower end, a hot water delivery line leading from the top of said tank to an appliance, a separate return line connected to the delivery line adjacent said appliance, a combined drain valve and recirculating fitting comprising a one-piece hollow body having an attaching portion mounted on said fitting and having an outlet portion, an internal partition between said attaching portion and said outlet portion, a valved opening in said partition, said body also having a relatively enlarged diffuser chamber between said attaching portion and said partition, a hollow boss formed on said body between said attaching portion and said partition, the inner end of said boss being in open communication with said diffuser chamber and the outer end of said boss being connected to said return line and a flow control orifice member of fixed size removably mounted in said boss coaxially thereof and outwardly of said diffuser chamber whereby water issuing from said orifice passes through said diffuser chamber before it enters said tank through said drain pipe fitting.

References Cited in the file of this patent
UNITED STATES PATENTS

| | | |
|---|---|---|
| 146,073 | Hodges | Dec. 30, 1873 |
| 1,519,594 | Shoemaker | Dec. 16, 1924 |
| 1,556,406 | Block | Oct. 6, 1925 |
| 1,824,716 | Gibbons | Sept. 22, 1931 |
| 1,856,504 | Parkinson | May 3, 1932 |
| 1,969,460 | Glenn | Aug. 7, 1934 |
| 2,255,460 | Weaver | Sept. 9, 1941 |
| 2,485,232 | Brown | Oct. 18, 1949 |
| 2,600,521 | Swisher | June 17, 1952 |
| 2,663,500 | Holtzclaw | Dec. 22, 1953 |
| 2,778,799 | Lindsay | Jan. 22, 1957 |